(12) United States Patent
Park et al.

(10) Patent No.: US 9,204,466 B2
(45) Date of Patent: Dec. 1, 2015

(54) METHOD AND APPARATUS OF CHANNEL ACCESS IN WIRELESS LOCAL AREA NETWORK

(71) Applicant: Electronics and Telecommunications Research Institute, Daejeon (KR)

(72) Inventors: Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 184 days.

(21) Appl. No.: 13/917,590

(22) Filed: Jun. 13, 2013

(65) Prior Publication Data
US 2013/0336251 A1 Dec. 19, 2013

(30) Foreign Application Priority Data
Jun. 13, 2012 (KR) .................. 10-2012-0063320

(51) Int. Cl.
*H04L 12/26* (2006.01)
*H04W 74/08* (2009.01)
*H04W 72/12* (2009.01)
*H04W 28/02* (2009.01)
*H04L 12/863* (2013.01)

(52) U.S. Cl.
CPC .......... *H04W 74/0816* (2013.01); *H04L 47/621* (2013.01); *H04L 47/6215* (2013.01); *H04W 28/0205* (2013.01); *H04W 72/1242* (2013.01)

(58) Field of Classification Search
CPC ............ H04L 47/2433; H04L 47/2441; H04L 47/6215; H04L 12/5693
USPC .................... 370/235, 395.4, 412, 395.42
See application file for complete search history.

(56) References Cited

U.S. PATENT DOCUMENTS

| | | | |
|---|---|---|---|
| 7,623,459 B2 * | 11/2009 | Yang et al. ................ 370/235 |
| 7,873,049 B2 * | 1/2011 | Gaur et al. ................ 370/392 |
| 7,873,050 B2 * | 1/2011 | Kim et al. ................ 370/392 |
| 7,944,835 B2 * | 5/2011 | Ahn et al. ................ 370/235 |
| 8,451,749 B2 * | 5/2013 | Tanaka et al. ............. 370/253 |
| 8,675,660 B2 * | 3/2014 | Abel et al. ................ 370/392 |
| 8,824,291 B2 * | 9/2014 | Ohya et al. ............... 370/232 |
| 2005/0152373 A1 * | 7/2005 | Ali ....................... 370/395.4 |
| 2011/0235513 A1 * | 9/2011 | Ali ....................... 370/232 |

* cited by examiner

*Primary Examiner* — Dang Ton
*Assistant Examiner* — Sai Aung

(57) ABSTRACT

A channel access method in WLAN system is provided. The method includes receiving packets transmitted from a higher protocol layer, classifying the packets to map the packets to ACs to which the packets correspond, transmitting the packets to queues corresponding to the ACs to which the packets are mapped, among a plurality of queues by ACs, independently applying a channel access function to each of the plurality of queues by ACs by avoiding a collision among the plurality of queues by ACs, transmitting a packet determined to be transmitted first, according to the application result of the channel access function. The packet includes a first frame to be transmitted to a first terminal and a second frame to be transmitted to a second terminal. The plurality of queues by ACs are queues with respect to the first frame to be transmitted to the first terminal.

10 Claims, 7 Drawing Sheets

METHOD AND APPARATUS OF CHANNEL ACCESS IN WIRELESS LOCAL AREA NETWORK

CROSS-REFERENCE TO RELATED APPLICATIONS

This application claims the benefit of priority of Korean Patent Application No. 10-2012-0063320 filed on Jun. 13, 2012, which is incorporated by reference in their entirety herein.

BACKGROUND OF THE INVENTION

1. Field of the Invention

The present invention relates to wireless communications, and more particularly, to a channel access method in a wireless local area network (WLAN), and an apparatus supporting the same.

2. Related Art

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

Since IEEE (Institute of Electrical and Electronics Engineers) 802, a standardization organization of a WLAN technique, was established in February 1980, a great deal of standardization works have been conducted.

The early WLAN technique supported the rate of 1~2 Mbps through frequency hopping, spread spectrum, infrared communications, and the like, by using a 2.4 GHz frequency based on IEEE 802.11, and recently, a maximum rate of 54 Mbps can be supported by employing orthogonal frequency division multiplex (OFDM) technology to the WLAN. Further, IEEE 802.11 are putting standards of various techniques, such as improvement of quality of service (QoS), allowing for compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

A basic access mechanism of an IEEE 802.11 MAC (Medium Access Mechanism) is a CSMA/CA (Carrier Sense Multiple Access with Collision Avoidance) combined with binary exponential backoff. The CSMA/CA mechanism is also called a DCF (Distributed Coordination Function) of IEEE 802.11 MAC, basically employing a 'listen before talk' access mechanism. In this type of access mechanism, a station (STA) first listens to a radio channel or a medium before starting a transmission. Upon listening, when it is detected that the medium is not in use, the listening station starts its transmission. Meanwhile, when it is detected that the medium is in use, the station enters a delay period determined by a binary exponential backoff algorithm, rather than starting its transmission.

A station which has accessed a channel through the foregoing channel access procedure may obtain authority to use a wireless medium and transmit its frame.

SUMMARY OF THE INVENTION

The present invention provides a method for managing a queue applicable to a frame transmission of a wireless local area network (WLAN) terminal supporting a multi user-multiple input multiple output (MU-MIMO) transmission, and a channel access method based thereon.

In an aspect, a channel access method in a wireless local area network (WLAN) system is provided. The method includes receiving packets to be transmitted from a higher protocol layer, classifying the packets to map the packets to access categories (ACs) to which the packets correspond, transmitting the packets to queues corresponding to the ACs to which the packets are mapped, among a plurality of queues by ACs, independently applying a channel access function to each of the plurality of queues by ACs by avoiding a collision among the plurality of queues by ACs, transmitting a packet determined to be transmitted first, according to the application result of the channel access function. The packet includes a first frame to be transmitted to a first terminal and a second frame to be transmitted to a second terminal. The plurality of queues by ACs are queues with respect to the first frame to be transmitted to the first terminal.

The queue with respect to the second frame to be transmitted to the second terminal may be implemented in a higher layer of a layer in which the queue with respect to the first frame is implemented.

The channel access function may be applied to a transmit buffer descriptor (TxBD) of the first terminal existing in the queue with respect to the first frame.

The TxBD may include an MU bit flag indicating whether or not the second frame with respect to the second terminal exists.

The MU bit flag may further include information indicating whether or not a MU-MIMO (Multi user-multiple input multiple output) of the packet is transmitted.

The channel access function may be an EDCA (enhanced distributed channel access) function.

In another aspect, a terminal performing a channel access method in a wireless local area network (WLAN) system is provided. The terminal includes a processor. The processor are configured to perform: receiving packets to be transmitted from a higher protocol layer, classifying the packets to map the packets to access categories (ACs) to which the packets correspond, transmitting the packets to queues corresponding to the ACs to which the packets are mapped, among a plurality of queues by ACs, independently applying a channel access function to each of the plurality of queues by ACs by avoiding a collision among the plurality of queues by ACs, transmitting a packet determined to be transmitted first, according to the application result of the channel access function. The packet includes a first frame to be transmitted to a first terminal and a second frame to be transmitted to a second terminal. The plurality of queues by ACs are queues with respect to the first frame to be transmitted to the first terminal.

According to embodiments of the present invention, within a station of WLAN system supporting a transmission of MU-MIMO (Multi User-Multiple Input Multiple Output), queues with respect to a plurality of multiple users are controlled only with one physical queue by access categories, thereby lowering complexity of implementation.

DESCRIPTION OF EXEMPLARY EMBODIMENTS

Hereinafter, embodiments of the present invention will be described in detail with reference to the accompanying drawings. In describing the present invention, if a detailed explanation for a related known function or construction is considered to unnecessarily divert the gist of the present invention, such explanation will be omitted but would be understood by those skilled in the art.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

Figure 1:
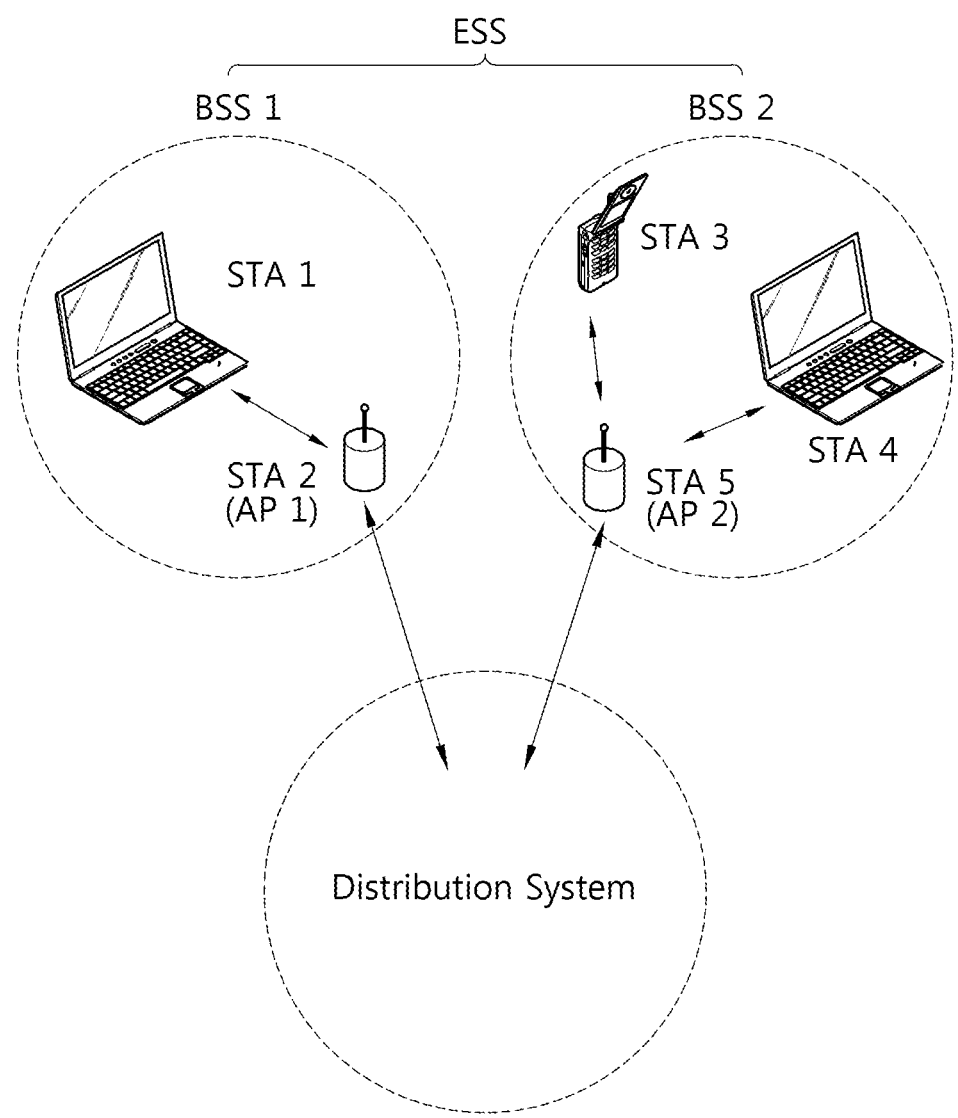
FIG. 1 illustrates an example of a wireless local area network (WLAN) system according to an embodiment of the present invention.

FIG. 1 illustrates an example of a wireless local area network (WLAN) system according to an embodiment of the present invention.

With reference to FIG. 1, a WLAN system includes one or more of basic service sets (BSSs). A BSS refers to a set of stations (STAs) that can communicate with each other in synchronization, rather than a concept indicating a particular area.

The BSS may be divided into an infrastructure BSS and an independent BSS (IBSS). FIG. 1 illustrates the infrastructure BSS. The infrastructure BSS (BSS1 and BSS2) includes one or more non-AP stations (STAs) (STA1, STA3, STA4), access points (AP1 (STA2), AP2 (STA5) as stations providing a distribution service (DS), and a distribution system (DS) connecting the plurality of APs (AP1 and AP2). In the infrastructure BSS, the AP STA manages the non-AP STAs of the BSS.

Meanwhile, the IBSS is a BSS operating in an ad-hoc mode. The IBSS does not include an AP, so it cannot be a centralized management entity performing a management function at the center. Namely, in the IBSS, non-AP STAs are managed in a distributed manner. IN the IBSS, every STA may be configured as a mobile station, and the IBSS establishes a self-contained network, not allowing an access to a distribution system (DS).

A station is a certain function medium including a medium access control (MAC) and a physical layer interface with respect to a wireless medium which follow the stipulation of IEEE 802.11 standard. A station includes both AP and non-AP stations in a broad sense.

A station for radio communications may include a processor and a transceiver, and may further include a user interface, a display unit, and the like. The processor, a function unit devised to generate a frame to be transmitted via a wireless network or process a frame received via the wireless network, performs various functions to control a station. The transceiver, which is functionally connected with the processor, is configured to transmit and receive frames via the wireless network for the station.

Among the stations STAs, mobile terminal manipulated by a user are non-AP STA (STA1, STA3, STA4, STA4, STA5). The non-AP STA may be referred to by other names such as terminal, wireless transmit/receive unit (WTRU), user equipment (UE), mobile station (MS), mobile terminal, mobile subscriber unit, or the like.

The APs (AP1 and AP2) are functional entities for providing an access to the DS by way of a wireless medium for an STA (Associated Station) associated thereto. In the infrastructure BSS including the APs, in principle, communications between non-AP STAs are made by way of the APs, but when a direct link has been established (e.g., when a DLS or TDLS service is supported), the non-AP STAs can directly communicate with each other. The AP may also be called by other names such as centralized controller, base station (BS), node-B, base transceiver system (BTS), site controller, and the like.

A plurality of infrastructure BSSs may be connected via the DS. The plurality of BSSs connected via the DS is called an extended service set (ESS). STAs included in the ESS may communicate with each other, and a non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS may not be necessarily a network. Namely, the DS is not limited to any form so long as it can provide a certain distribution service stipulated in IEEE 802.11 standard. For example, the DS may be a wireless network such as a mesh network or a physical structure connecting the APs.

Hereinafter, an AP and a non-AP STA of a WLAN system will be generally called a terminal. The WLAN system to which an embodiment of the present invention is applicable supports MU-MIMO transmission. MU-MIMO transmission is a scheme of transmitting, by a terminal having multiple antennas, frames to a plurality of target terminals by using a plurality of spatial streams. In general, MU-MIMO transmission refers to transmitting, by an AP of an infrastructure BSS, a frame on one or more spatial streams to each terminal with respect to a plurality of terminals among a plurality of terminals associated with the AP. A group of a plurality of terminals as targets of MU-MIMO transmission may be indicated by an identifier (e.g., a group ID) indicating a group.

In a terminal of the WLAN system supporting MU-MIMO, a single PPDU (physical layer convergence procedure (PLCP) protocol data Unit) may include frames (e.g., MPDU (MAC protocol data unit)) to be transmitted a plurality of target terminals. The PPDU is a basic unit when an MPDU generated in a MAC layer of a terminal is transmitted on a WM through a physical (PHY) layer. The MU-PPDU refers to a PPDU transmitted to a plurality of target terminals according to the MU-MIMO transmission technique.

The present embodiment may be applied to a case in which a terminal supporting MU-MIMO transmission wants to transmit data to a plurality of target terminals by using the MU-MIMO transmission technique, and there is no limitation in an object or a subject of the transmission.

The terminal operating in the WLAN system to which the present invention is applicable may access a channel according to an EDCA (enhanced distributed channel access) scheme defined in IEEE 802.11e, one of standards in relation to a WLAN system, and after accessing a channel, the terminal may transmit a frame thereof to a target terminal by using a wireless medium (WM). The EDCA technique is a contention-based channel access scheme. Here, a transmission opportunity according to the contention-based channel access scheme will be described briefly.

An HCF, based on an IEEE 802.11 MAC protocol, a DCF (Distributed Coordination Function) and a PCF (Point Coordination Function), has EDCA (Enhanced Distributed Channel Access) based on contention and an HCCA (HCF Controlled Channel Access) using a channel access scheme based on contention-free using a polling mechanism as an access scheme in which a provider provides data packets to a plurality of users.

The HCF includes a medium access mechanism for enhancing QoS (Quality of Service) of the WLAN, and QoS data may be transmitted in both of a contention period (CP) and a contention-free period (CFP). DCF is a contention-based asynchronous access scheme, and PCF is a polling-based synchronous access scheme which periodically performs polling to allow every user to receive a data frame.

The EDCA, a contention-based channel access scheme, allows for differentiated media accesses with respect to frames having eight types of user priorities. Each frame arriving at a MAC layer from a higher layer has a particular user priority value, and a user priority value is included in a MAC header of each QoS data frame.

In order to transmit the QoS data frame including priority, a QoS station may implement four access categories. User priority of a frame arriving at the MAC layer is allocated to a corresponding single AC. Thus, when it is successful in the EDCA contention, it can obtain an EDCA transmission opportunity (TXOP).

Namely, in the EDCA, a channel access function including different parameters by ACs is independently performed and a channel is accessed through a process of handling a collision between ACs. Through this, priority is reflected in a frame transmission and a QoS service can be provided. Here, each channel access function has a queue exposed to outside of 1. The terminal attempts to access a channel to transmit a frame present in the exposed queue.

The terminal operating in a general network, as well as a terminal of a WLAN system, uses a buffer for temporarily storing a corresponding frame, a buffer descriptor for storing position and control information of a corresponding frame, or a packet descriptor in order to express a frame the terminal wants to transmit. An EDCA function attempts to access a channel according to FIFO (first input first output), or when there is a frame to be transmitted in a queue, the EDCA attempts to access a channel in order to transmit the corresponding frame. The FIFO scheme is a scheme of first transmitting a frame first added to the queue, without consideration of transmission priority which considers the characteristics, or the like, of data included in a frame. In other words, a transmission is made according to order in which frames added to a queue. Thus, in the FIFO scheme, conceptually, a frame is enqueued to a queue, but in an actual implementation, a buffer scriptor is added to a queue in many cases.

In general, a queue is configured as a single or double linked list in which buffer scriptors are linked alone or double such that a next buffer descriptor can be tracked.

Figure 2:
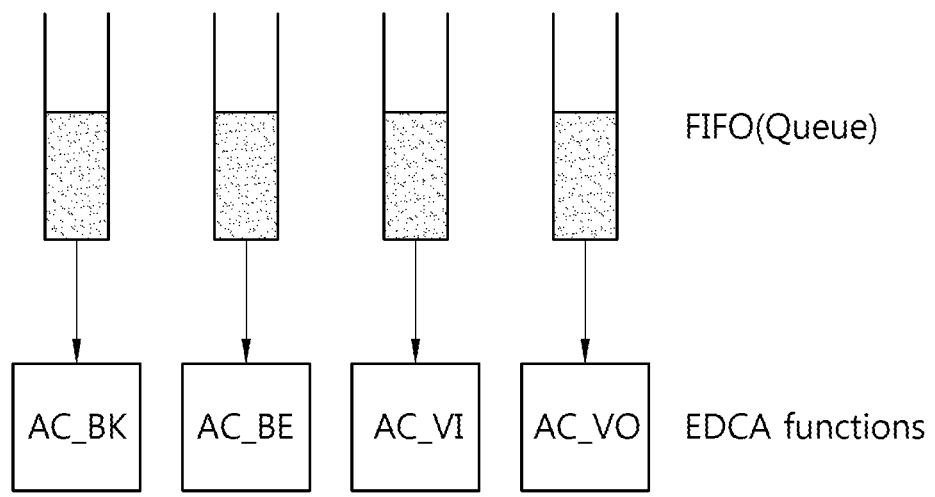
FIG. 2 conceptually illustrates a queue viewed by an EDCA function.

FIG. 2 conceptually illustrates a queue viewed by an EDCA function. In the queue structure illustrated in FIG. 2, in general, a software layer enqueues a buffer descriptor to a queue and the EDCA function largely implemented by hardware checks the presence of a buffer descriptor existing in FIFO and dequeues it from a queue. Namely, it serves as a passage for transferring a packet to be transmitted between a layer implemented by software and a layer implemented by hardware.

Before a HT (High Throughput) WLAN system supporting IEEE 802.11n, a SISO (Single Input Single Output) or SU (Single User) MIMO has been used to transmit a frame. Unlike the SISO as a scheme in which a terminal having a single antenna transmits a frame to a single counterpart terminal, the SU-MIMO technique adopted in the HT WLAN system supports an SU-MIMO scheme in which multiple antennas are provided to transmit data on a maximum of four spatial streams, obtaining higher throughput. The SU-MIMO scheme is differentiated from the SISO in which data is transmitted on a single spatial stream by using a single antenna, in that data is transmitted on a plurality of spatial streams by using multiple antennas, but the both methods are common in that a target is a single terminal. In that a target terminal of frame transmission is a single terminal, the channel access function in the MAC (Medium Access Control) described along with FIG. 2 may be used.

Figure 3:
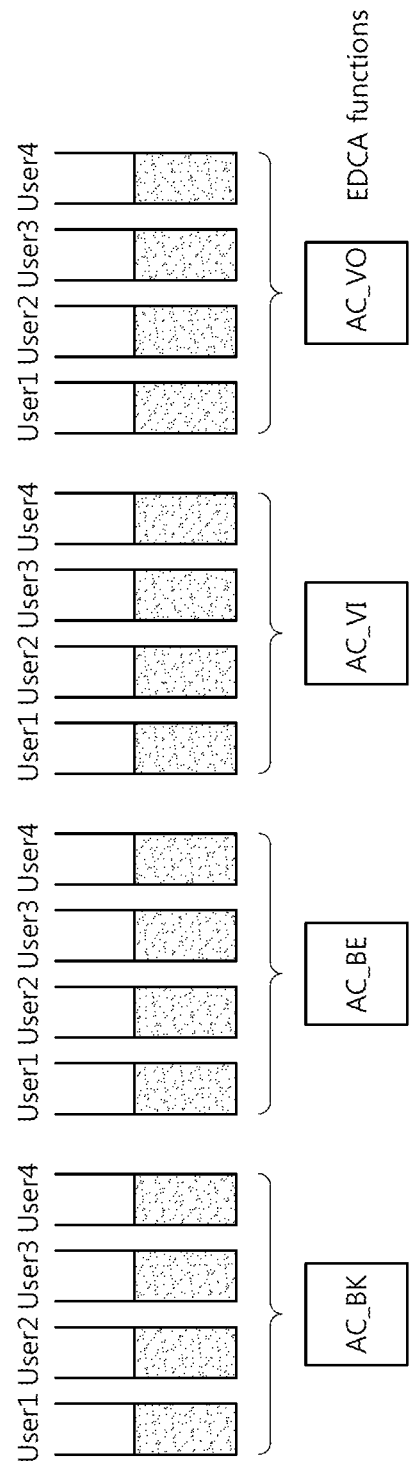
FIG. 3 is a view illustrating a relationship between a queue and an EDCA function in a terminal supporting MU-MIMO transmission.

FIG. 3 is a view illustrating a relationship between a queue and an EDCA function in a terminal supporting MU-MIMO transmission.

In the example of FIG. 3, a case in which target terminals of MU-MIMO transmission is four (user 1 to user 4) is illustrated. Hereinafter, a user refers to a target terminal of a frame as an object of MU-MIMO transmission. Namely, a user may be a target STA, and may be indicated by a group ID of a PHY preamble included in an MU-PPDU or a receiver address (RA) field of a MAC header of an MPDU included in a MU-PPDU.

Herein the frame transferred to each user is transmitted on different spatial streams in the MU-MIMO transmitted MU-PPDU through different queues. User 1, User 2, user 3, and User 4 serve to separating terminals when data are simultaneously transmitted without designating particular terminals to which data are simultaneously transmitted.

In the embodiment of FIG. 3, there are four queues (queues of user 1 to user 4) per AC internally, but they are operated such that one exposed queue is viewed in view of the EDCA function. In view of EDCA function, even when only one frame exists in the queue of each user included in a single AC, it may be regarded that there is a frame to be transmitted in the queue of the corresponding AC and a channel access procedure may be performed.

Figure 4:
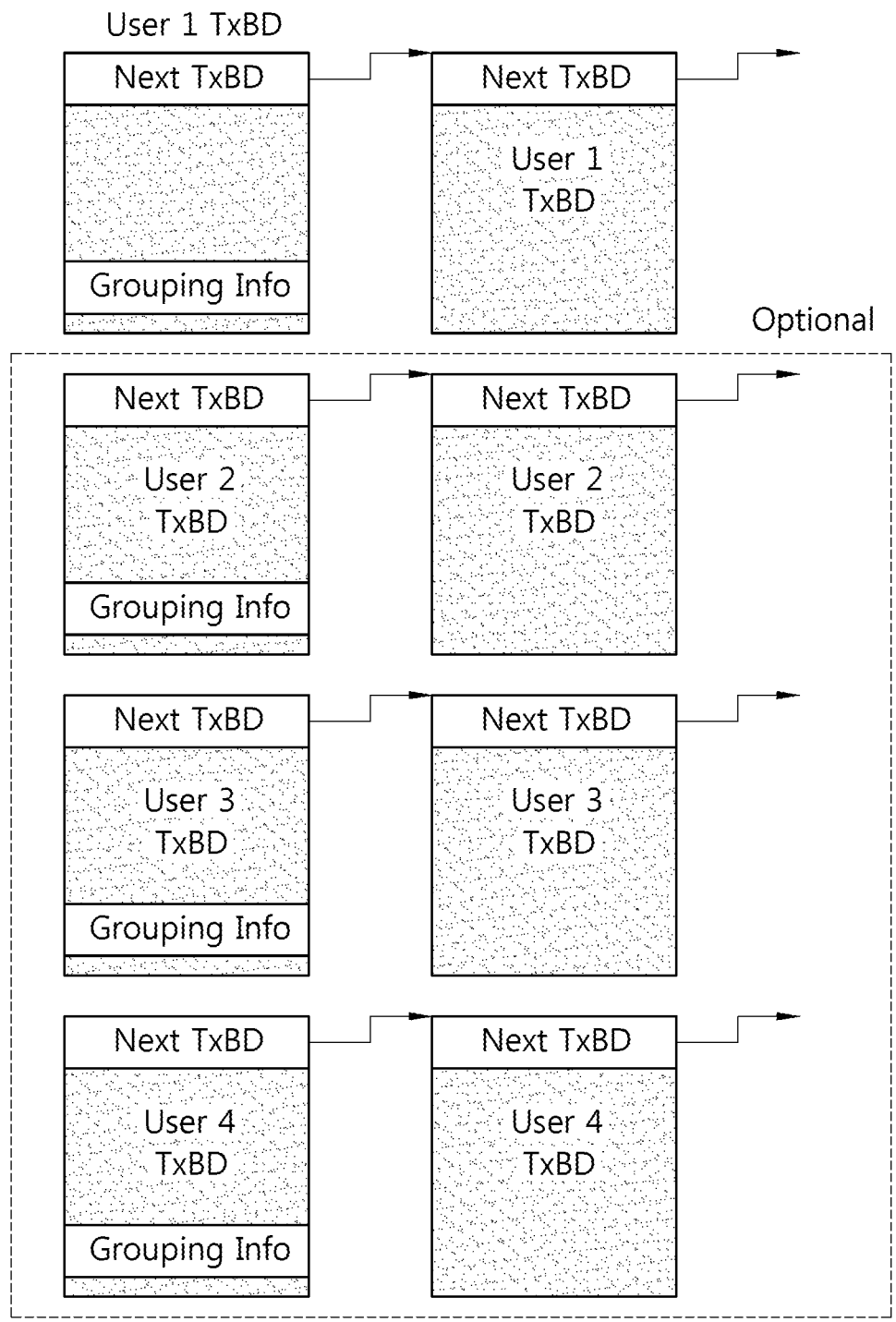
FIG. 4 is a view illustrating an example of a method for identifying an MPDU of each user included in an MU-PPDU.

FIG. 4 is a view illustrating an example of a method for identifying an MPDU of each user included in an MU-PPDU.

In FIG. 4, a TxBD refers to a transmit buffer descriptor, and has information of a frame when transmitted. The TxBD belonging to queues of the respective users may be configured in the form of a linked list linked to users. User frames included in the same MU-PPDU have the same group information and inform the EDCA function that they should be included in the same PPDU and transmitted. In the channel access function by ACs, a state of a maximum of four queues is tracked, and whether or not frames present in respective queues should be included in the same PPDU and transmitted is required to be determined.

When four ACs are intended to be implemented, a maximum of 16 queues should be implemented and a stat should be tracked. TxBD may include an ownership flag indicating which block processes and owns a frame. The ownership flag may be updated when the block which currently processes/owns a frame completes the processing and returns the TxBD. The same method as a method for setting the ownership flag with respect to user 1 may be applied to the user 2, the user 3, and the user 4. In general, a function of monitoring a state of a queue and the EDCA function are implemented by hardware, so as the number of queues is increased, implementation complexity and costs may be increased.

Figure 5:
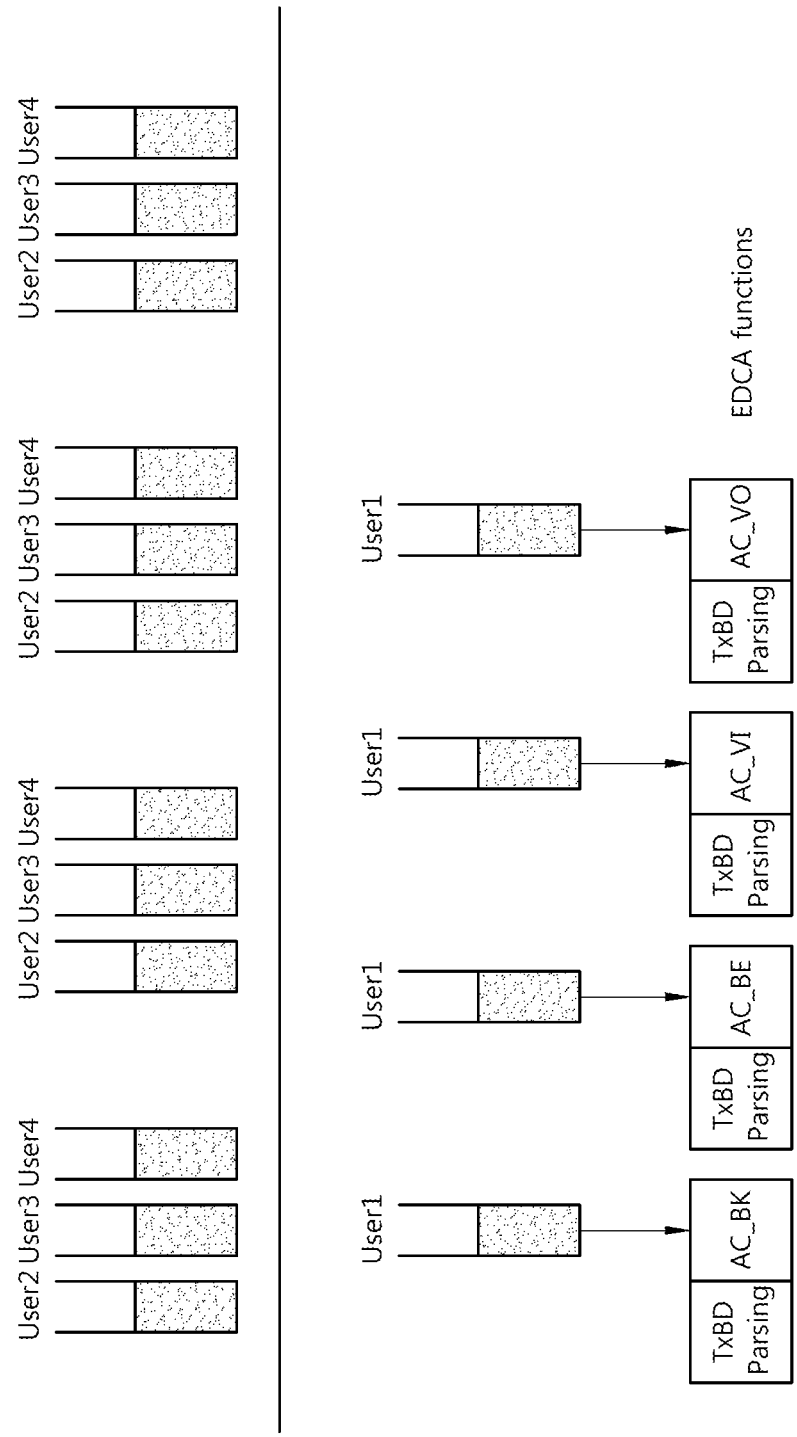
FIG. 5 is a view simply showing a queue in view of the EDCA function in a WLAN terminal to which an embodiment of the present invention is applied.

FIG. 5 is a view simply showing a queue in view of the EDCA function in a WLAN terminal to which an embodiment of the present invention is applied.

Referring to FIG. 5, the number and structure of queues in view of EDCA function may be maintained to be one queue like the related art described in the example of FIG. 2. Here, queues corresponding to the remaining multiple users user 2, user 3, and user 4, other than the user 1, may be positioned in a higher layer. In other words, one terminal among the plurality of target terminals for MU-MIMO transmission may be implemented according to the related art method, and queues of the other remaining target terminals may be generated and managed in the higher layer.

If MU-MIMO transmission is not used, only the queue with respect to the user 1 in the example of FIG. 5 may be used, and queues for the other remaining users may not be generated in the higher layer. In the example of FIG. 5, it is illustrated that queues are configured respectively for the user 2, the user 3, and the user 4, but this is merely illustrative to clarify the concept of the present invention. In the present embodiment, the queues with respect to the user 2, the user 3, and the user 4 are implemented in the higher layer, so they are unrelated to the EDCA function (namely, they do not directly affect the operation of the EDCA function). Thus, the TxBD may be implemented in various forms without regard to a particular scheme. For example, traffic to be transmitted to users implemented in the higher layer may be managed according to a method such as a linked list, a linked array, or the like, by integrating the user 2, the user 3, and the user 4, without having the form of queues.

In the example of FIG. 5, a counterpart of the transmission in view of the EDCA function is the one user 1, so the EDCA function may track a state of the queue of the user 1 in the same manner as that of the related art. Namely, in the channel access function, the TxBD present in one queue in which the TxBD of the user 1 is included is processed and a state is tracked, and a channel access procedure is not performed on the TxBD of the other remaining users (user 2 to user 4).

Figure 6:
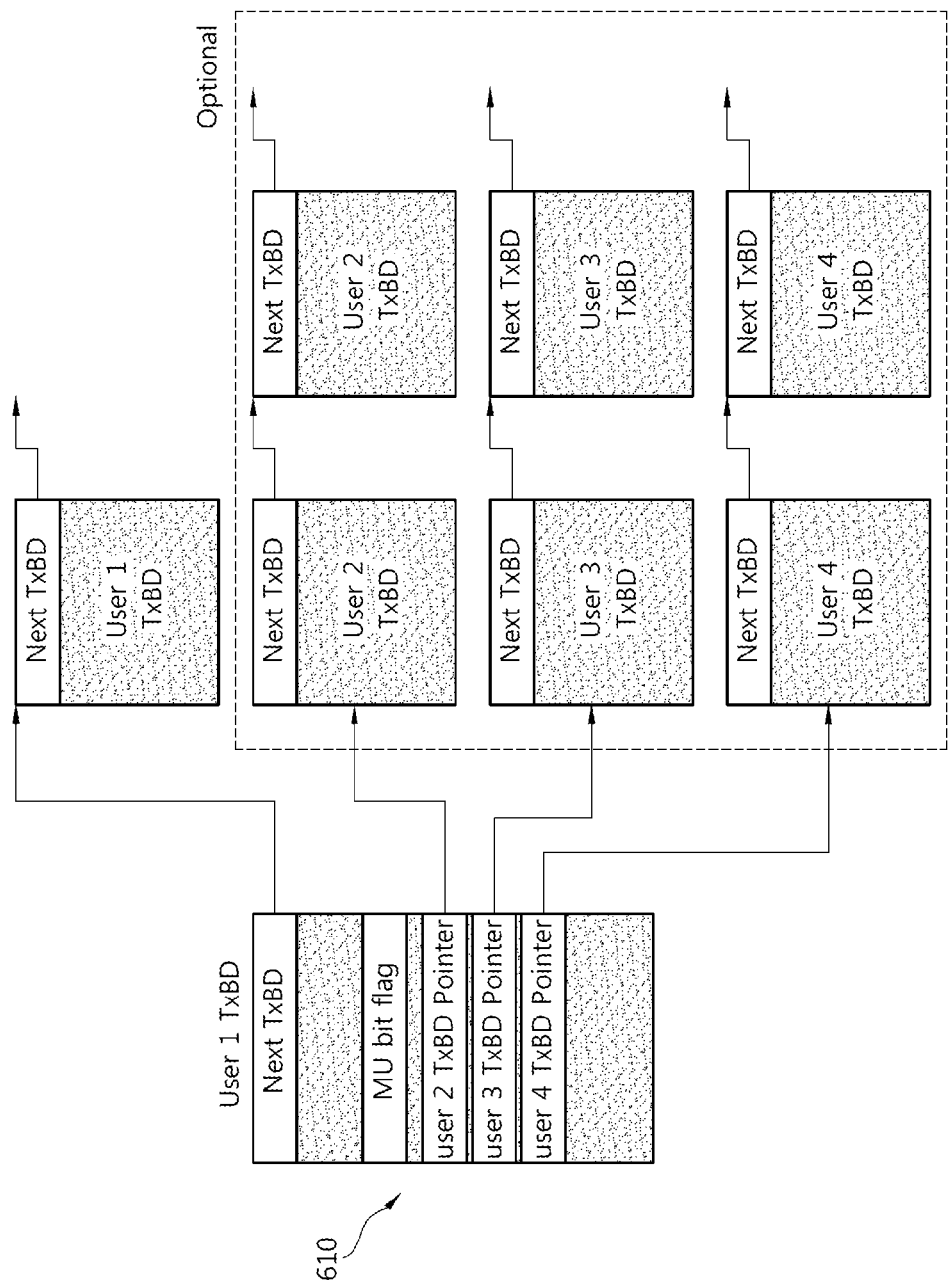
FIG. 6 is a view illustrating an example of an indication method for identifying each data of multiple users included in one PPDU according to an embodiment of the present invention.

FIG. 6 is a view illustrating an example of an indication method for identifying each data of multiple users included in one PPDU according to an embodiment of the present invention.

In the WLAN system, the PPDU transmitted through a wireless medium may include one or more MPDUs. The MU-PPDU, which is MU-MIMO transmitted, may include MPDUs with respect to several user. According to an embodiment of the present invention, in case of the MU-MIMO transmission as shown in FIG. 6, TxBD of the user 1 may include MU bit flag 610. The MU bit flag 610 may include information indicating whether or not there is a frame to be transmitted to each user and indicating whether or not MU-MIMO is transmitted.

From the MU bit flag 610 included in the TxBD of the user 1, to which user a frame to be transmitted is related can be found. In detail, as shown in the example of FIG. 5, when the TxBD of the user 1 includes bit flags indicating the user 2, the user 3, and the user 4, a parsing function may check an address of a TxBD pointer designated by each bit flag to obtain TxBD information with respect to multiple users and transmit data.

Here, as described above, the TxBDs belonging to the user 2, the user 3, and the user 4 may exist in the higher function in which the TxBD of the user 1 is added to a queue, rather than in a queue. In managing the TxBD with respect to multiple users, the higher function may be subordinated to the result of the user 1 to manage ownership of the TxBD, or the like.

Figure 7:
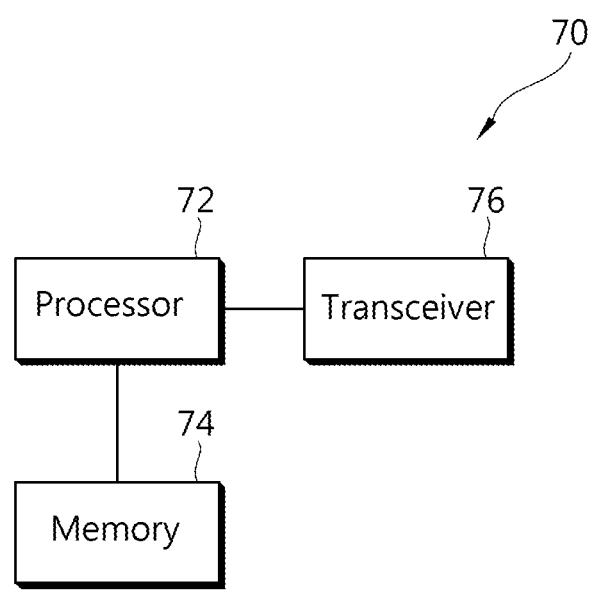
FIG. 7 is a block diagram showing a wireless device to which an embodiment of the present invention is applicable.

FIG. 7 is a block diagram showing a wireless device to which an embodiment of the present invention is applicable. A wireless device 70 is a terminal that may implement the foregoing embodiment, which may be an AP or a non-AP station supporting a MU-MIMO transmission.

The wireless device 70 includes a processor 72, a memory 74, and a transceiver 76. The transceiver 76 transmits/receives a radio signal and implements a physical layer of IEEE 802.11. The processor 72 is functionally connected to the transceiver 76 to implement a MAC layer and a physical layer of IEEE 802.11. The processor 72 may be configured to generate and transmit a frame including the VHT control field proposed by the present invention or interpret a value of the VHT control field included in a received frame to obtain control information. In case in which the wireless device 70 operates as an STA that transmits an MFB, when a link adaption procedure starts to support a link adaptation method according to an embodiment of the present invention, the processor 72 calculates a recommended MCS and feeds it back to an AP. The processor 72 may be configured to implement the foregoing embodiments of the present invention.

The processor 72 and/or transceiver 76 may include an ASIC (application-specific integrated circuit), a different chip set, a logical circuit and/or data processing unit. The memory 74 may include a ROM (read-only memory), a RAM (random access memory), a flash memory, a memory card, a storage medium and/or any other storage devices. When an embodiment is implemented by software, the foregoing scheme may be implemented as a module (process, function, etc.) performing the foregoing function. The module may be stored in the memory 74 and executed by the processor. The memory 74 may be present within or outside the processor 72 and may be connected to the processor through various known units.

The effective data structure and queue structure for transmitting multi-user frames belonging to the same PPDU within a WLAN terminal supporting MU-MIMO transmission proposed by the present invention has advantages in that queues with respect to multiple users can be controlled by only a single physical queue by ACs.

While the present invention has been shown and described in connection with the embodiments, it will be apparent to those skilled in the art that modifications and variations can be made without departing from the spirit and scope of the invention as defined by the appended claims.

What is claimed is:

1. A channel access method in a wireless local area network (WLAN) system, the method comprising:
   receiving packets to be transmitted from a higher protocol layer;
   classifying the packets to map the packets to access categories (ACs) to which the packets correspond;
   transmitting the packets to queues corresponding to the ACs to which the packets are mapped, among a plurality of queues by ACs;
   independently applying a channel access function to each of the plurality of queues by ACs by avoiding a collision among the plurality of queues by ACs,
   transmitting a packet determined to be transmitted first, according to the application result of the channel access function,
   wherein the packet includes a first frame to be transmitted to a first terminal and a second frame to be transmitted to a second terminal,
   the plurality of queues by ACs are queues with respect to the first frame to be transmitted to the first terminal, and
   wherein the queue with respect to the second frame to be transmitted to the second terminal is implemented in a higher layer of a layer in which the queue with respect to the first frame is implemented.

2. The method of claim 1, wherein the channel access function is applied to a transmit buffer descriptor (TxBD) of the first terminal existing in the queue with respect to the first frame.

3. The method of claim 2, wherein the TxBD includes a flag indicating whether or not the second frame with respect to the second terminal exists.

4. The method of claim 3, wherein the flag further includes information indicating whether or not a MU-MIMO (Multi user-multiple input multiple output) of the packet is transmitted.

5. The method of claim 1, wherein the channel access function is an EDCA (enhanced distributed channel access) function.

6. A terminal performing a channel access method in a wireless local area network (WLAN) system, the terminal comprising:
   a processor,
   wherein the processor are configured to perform:
   receiving packets to be transmitted from a higher protocol layer;
   classifying the packets to map the packets to access categories (ACs) to which the packets correspond;
   transmitting the packets to queues corresponding to the ACs to which the packets are mapped, among a plurality of queues by ACs;
   independently applying a channel access function to each of the plurality of queues by ACs by avoiding a collision among the plurality of queues by ACs,
   transmitting a packet determined to be transmitted first, according to the application result of the channel access function,
   wherein the packet includes a first frame to be transmitted to a first terminal and a second frame to be transmitted to a second terminal,
   the plurality of queues by ACs are queues with respect to the first frame to be transmitted to the first terminal, and
   wherein the queue with respect to the second frame to be transmitted to the second terminal is implemented in a higher layer of a layer in which the queue with respect to the first frame is implemented.

7. The terminal of claim 6, wherein the channel access function is applied to a transmit buffer descriptor (TxBD) of the first terminal existing in the queue with respect to the first frame.

8. The terminal of claim 7, wherein the TxBD includes a flag indicating whether or not the second frame with respect to the second terminal exists.

9. The terminal of claim 8, wherein the flag further includes information indicating whether or not a MU-MIMO (Multi user-multiple input multiple output) of the packet is transmitted.

10. The terminal of claim 6, wherein the channel access function is an EDCA (enhanced distributed channel access) function.

* * * * *